UNITED STATES PATENT OFFICE.

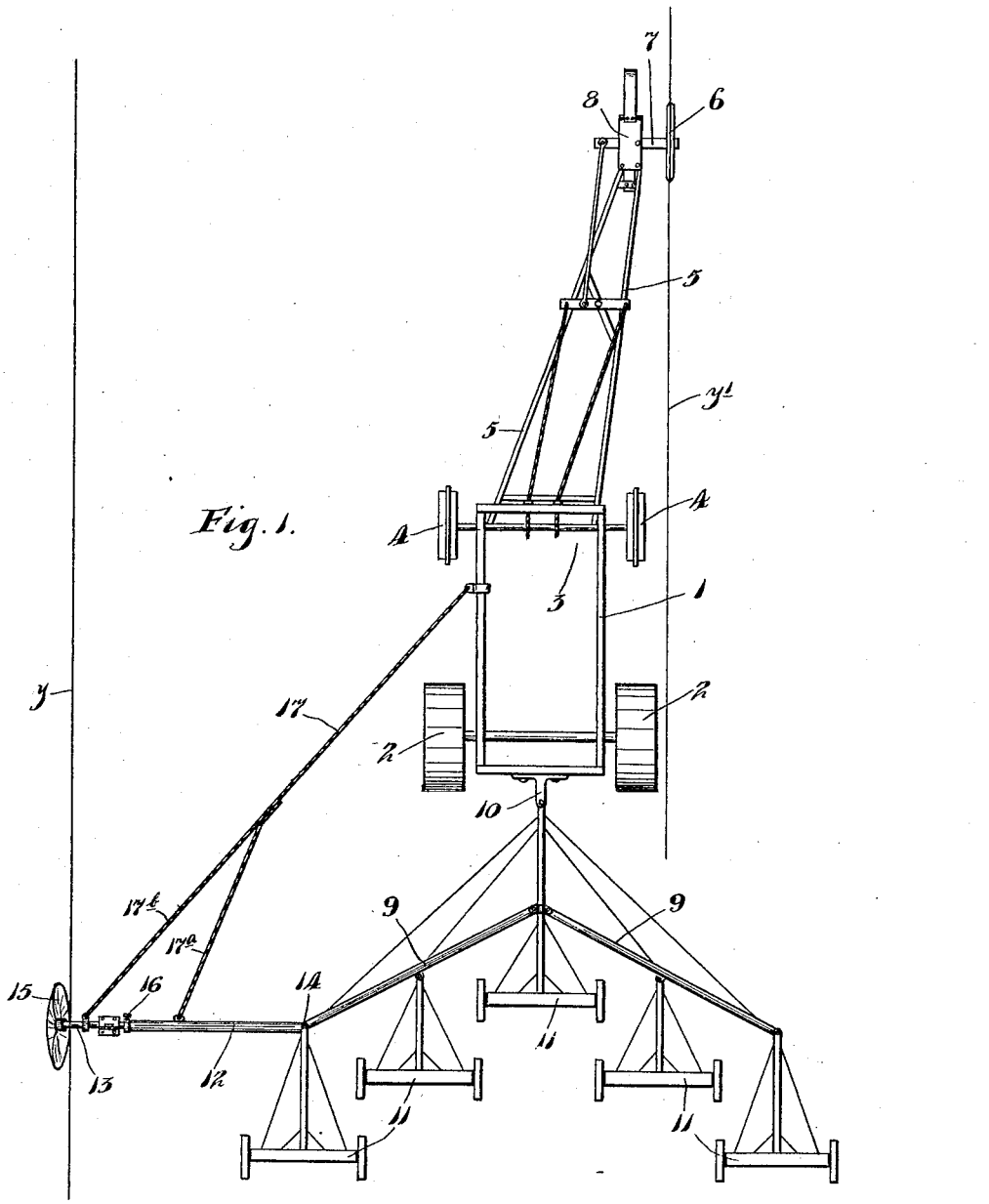

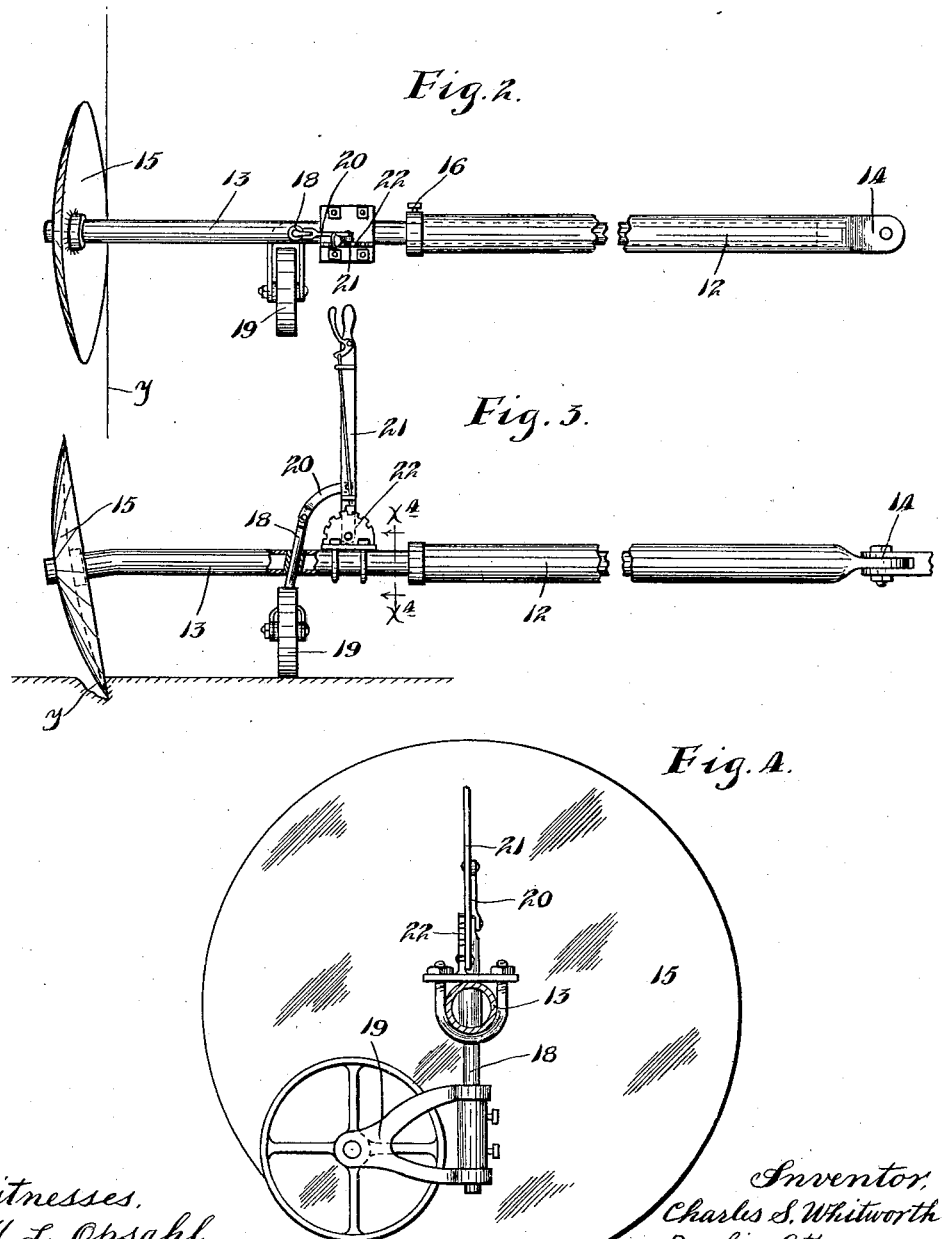

CHARLES S. WHITWORTH, OF CEDAR FALLS, IOWA.

GUIDE-FURROW-FORMING ATTACHMENT FOR TRACTION-RIGS.

1,111,243.  Specification of Letters Patent.  Patented Sept. 22, 1914.

Application filed June 4, 1912. Serial No. 701,501.

*To all whom it may concern:*

Be it known that I, CHARLES S. WHITWORTH, a citizen of the United States, residing at Cedar Falls, in the county of Blackhawk and State of Iowa, have invented certain new and useful Improvements in Guide-Furrow-Forming Attachments for Traction-Rigs; and I do hereby declare the following to be a full, clear, and exact description of the invention, such as will enable others skilled in the art to which it appertains to make and use the same.

My invention relates to traction gang rigs of that type wherein a gang of drills, seeding machines, or other land cultivators are drawn from a traction engine, and the traction engine is guided by a forwardly projecting guide mechanism including a guide wheel arranged to run in a furrow or lineal depression previously formed in the ground. When such a traction engine is employed in connection with gang plows, the last, or land side furrow may be used to direct the travel of the guide wheel, but when cultivators, such as drills or seeding machines or harrows are drawn in a gang from the traction engine, no definite or marked furrow is formed which is capable of use to direct the travel of the guide wheel.

My invention provides a guide furrow former for use in connection with traction rigs of the character above noted, and to such ends, generally stated, the invention consists of the novel devices and combinations of devices hereinafter described and defined in the claims.

Preferably, the improved guide furrow former is in the form of a rotary disk carried at the end of a long arm projecting laterally from a traction rig and offset therefrom, such a distance that on one course of travel of the traction rig the guide furrow will be formed on the proper line of travel for the traction engine guide wheel on the next course or trip.

The invention is illustrated in the accompanying drawings wherein like characters indicate like parts throughout the several views.

Referring to the drawings, Figure 1 is a plan view illustrating the invention; Fig. 2 is a plan view of the guide furrow forming attachment removed from working position, some parts being broken away; Fig. 3 is a rear elevation of the parts shown in Fig. 2, some parts being broken away and some parts being sectioned; and Fig. 4 is an enlarged vertical section taken on the line $x^4$ $x^4$ on Fig. 3.

Of the parts of the traction engine, the numeral 1 indicates the main frame, the numeral 2 the rear or traction wheels, the numeral 3 the pivoted front axle and the numeral 4 the front wheels.

Of the parts of the forwardly projecting guide mechanism, the numeral 5 indicates a guide frame which, at its rear end, is attached to the front axle 3 of the traction engine for horizontal swinging movements therewith, and the numeral 6 indicates the furrow following guide wheel journaled to an axle 7 intermediately pivoted to the bearing head 8, secured to the front end of the said frame 5.

The numeral 9 indicates a laterally spread gang frame which is shown as pivotally attached to a bearing 10 on the rear end of the main frame 1 of the traction engine; and the numeral 11 indicates, as entireties, a gang or plurality of drills, seeders, or similar cultivating machines attached to and drawn from the said gang frame 9.

The guide furrow forming attachment, as preferably constructed, comprises a long telescopically extensible or adjustable arm made up of tubular sections 12 and 13, the latter of which is telescoped into the former. The inner end of the larger tube 12 is conveniently attached to one side of the gang frame 9 by a hinge or pivot joint 14 which permits of horizontal angular adjustment to the said arm, and which has sufficient play to permit of a considerable of a vertical movement of the outer end of the said arm. The extreme outer end of the smaller tube 13 is bent slightly downward at an angle, and thereon is journaled a furrow former preferably in the form of a concavo convex disk 15 set at the proper angle to form the desired guide furrow. The desired longitudinal adjustment of the tube 13, in respect to the tube 12, is maintained by a set screw 16.

The arm 12—13 is held approximately at a right angle to the line of travel by a guide cable or rope 17, shown as attached to one side of the main frame 1 of the traction engine and having branches 17$^a$ and 17$^b$ attached, respectively, to the tubes 12 and 13.

The disk 15 will be properly held to its work by its own weight and by the weight of the arm 12—13, but to limit the depth of the furrow which it will cut, and to support the same above the ground in an inoperative position when desired, I provide a lifting device, preferably constructed, as shown, and comprising a stem or rod 18 mounted for approximately vertical movements through the tube 13 and having a caster wheel 19 applied to its lower end and arranged to run on the ground. The upper end of the stem 18 is connected by a link 20 to a latch lever 21 that is pivoted to and coöperates with a latch segment 22, rigidly secured to the said tube 13.

When the guide furrow forming disk 15 is properly adjusted, it should, with the arrangement illustrated, be offset toward the left, a distance from the near side of the left hand drill 11, a distance which is approximately equal to the distance that the guide wheel 6 is offset toward the left from the right hand side of the right hand drill 11. When so arranged, it will form a furrow on the line marked $y$ on Fig. 1, which, from the pivotally formed guide furrow $y^1$ is offset approximately the distance equal to the width of the swath that is worked or covered by the gang of drills. Hence, the guide furrow $y$ formed on one trip or course will be on the proper line to guide the guide wheel 6 on the next trip or course. With this arrangement, therefore, the guiding of the rig may be accomplished automatically, by the guide wheel 6 running in a previously formed guide furrow. This automatically guiding action not only lessens the labor in the manipulation of the traction rig but insures accurate and proper travel of the rig necessary to completely cover the ground with seed or to completely cultivate the same without leaving any black or untouched surface spots or space.

The attachment is of small cost, efficient for the purposes had in view, and may be easily applied and easily removed from a traction rig of the character noted.

What I claim is:

1. The combination with a traction rig including a traction engine, an agricultural machine drawn thereby, and an automatic engine steering device having a guide-wheel adapted to follow a furrow, said agricultural machine being of a character that will not form a furrow such as will automatically direct the traveling movements of said guide-wheel, of a guide-furrow forming attachment independent of or additional to said agricultural machine applied to said rig and arranged to form a furrow on one trip adapted to be followed by said guide-wheel on a subsequent trip.

2. The combination with a traction rig including a traction engine, an agricultural machine drawn thereby, and an automatic engine steering device having a guide-wheel adapted to follow a furrow, said agricultural machine being of a character that will not form a furrow such as will automatically direct the traveling movements of said guide-wheel, of a guide-furrow forming attachment independent of or additional to said agricultural machine, said attachment comprising an arm attached to said agricultural machine and projecting at one side thereof and provided at its outer end with a furrow forming disk positioned to form a furrow on one trip which is adapted to be followed by said guide-wheel on a subsequent trip.

3. The combination with a traction rig including a traction engine, an agricultural machine drawn thereby, and an automatic engine steering device having a guide-wheel adapted to follow a furrow, said agricultural machine being of a character that will not form a furrow such as will automatically direct the traveling movements of said guide-wheel, of an independent or additional guide-furrow forming attachment applied to said machine and offset laterally thereof to form a furrow on one trip adapted to be followed by said guide-wheel on a subsequent trip, and a wheel supporting the outwardly extending portion of said furrow-forming attachment.

4. The combination with a traction rig including a traction engine, an agricultural machine drawn thereby, and an automatic engine steering device having a guide-wheel adapted to follow a furrow, said agricultural machine being of a character that will not form a furrow such as will automatically direct the traveling movements of said guide-wheel, of a guide-furrow forming attachment independent of or additional to said agricultural machine, said attachment comprising an arm attached to said agricultural machine and projecting at one side thereof and provided at its outer end with a furrow forming disk positioned to form a furrow on one trip which is adapted to be followed by said guide-wheel on a subsequent trip, and a wheel applied to and supporting the outer end of said arm.

5. The combination with a traction rig including a traction engine, an agricultural machine drawn thereby, and an automatic engine steering device having a guide-wheel adapted to follow a furrow, said agricultural machine being of a character that will not form a furrow such as will automatically direct the traveling movements of said guide-wheel, of a guide furrow forming attachment comprising an arm attached to said rig and projecting at one side thereof, provided at its outer end with a furrow forming disk positioned to form a furrow on one trip which is adapted to be followed by said guide wheel on a subsequent trip, a wheel applied to and supporting the outer end of said arm, and means for raising and lowering the outer end of said arm in respect to said wheel.

6. The combination with a traction rig including a traction engine, an agricultural machine drawn thereby, and an automatic engine steering device having a guide-wheel adapted to follow a furrow, said agricultural machine being of a character that will not form a furrow such as will automatically direct the traveling movements of said guide-wheel, of a guide furrow forming attachment comprising an arm attached to said rig and projecting at one side thereof and provided at its outer end with a furrow forming disk positioned to form a furrow on one trip which is adapted to be followed by said guide wheel on a subsequent trip, the said arm being longitudinally adjustable.

7. The combination with a traction rig including a traction engine, a guiding device for said engine having a guide wheel adapted to follow a furrow, a gang frame attached to the rear of said traction engine and a gang of earth working devices attached to said gang frame, of a guide furrow forming attachment comprising an arm attached to one side of said gang frame and connected to said traction engine and provided at its outer end with a furrow former.

8. The combination with a traction rig including a traction engine, a guiding device for said engine having a guide wheel adapted to follow a furrow, a gang frame attached to the rear of said traction engine and a gang of earth working devices attached to said gang frame, of a guide furrow forming attachment comprising an arm attached to one side of said gang frame and connected to said traction engine and provided at its outer end with a furrow forming disk.

9. The combination with a traction rig including a traction engine, a guiding device for said engine having a guide wheel adapted to follow a furrow, a gang frame attached to the rear of said traction engine and a gang of earth working devices attached to said gang frame, of a guide furrow forming attachment comprising an arm attached to one side of said gang frame and connected to said traction engine and provided at its outer end with a furrow former, and a wheel connected to and supporting the outer end of said arm.

10. The combination with a traction rig including a traction engine, a guiding device for said engine having a guide wheel adapted to follow a furrow, a gang frame attached to the rear of said traction engine and a gang of earth working devices attached to said gang frame, of a guide furrow forming attachment comprising an arm attached to one side of said gang frame and connected to said traction engine and provided at its outer end with a furrow former, a wheel connected to and supporting the outer end of said arm, and a lever with connections for moving the outer end of said arm vertically in respect to said supporting wheel, to thereby raise and lower said furrow forming disk.

11. The combination with a traction rig including a traction engine, an agricultural machine drawn thereby, and a guiding device for said engine having a guide wheel adapted to follow a furrow, said agricultural machine being of a character that will not form a furrow such as will automatically direct the traveling movements of said guide-wheel, of a guide furrow forming attachment independent of said machine, and applied to the said rig and arranged to form a furrow on one trip adapted to be followed by said guide wheel on a subsequent trip.

12. The combination with a traction rig including a traction engine, an agricultural machine drawn thereby and a guiding device for said engine having a guide wheel adapted to follow a furrow, said agricultural machine being of a character that will not form a furrow such as will automatically direct the traveling movements of said guide-wheel, of an arm projecting laterally from the said rig and capable of vertical movement and provided at its outer end with a furrow forming device arranged to form a furrow on one trip, adapted to be followed by said guide wheel on a subsequent trip.

13. The combination with a traction rig including a traction engine having a guide mechanism including a guide wheel arranged to follow a furrow, of a furrow forming attachment comprising an arm projecting laterally from said rig, capable of vertical movements and provided at its outer end with a furrow forming device arranged to form a furrow on one trip, adapted to be followed by said guide wheel on a subsequent trip.

14. The combination with a traction rig including a traction engine having a guide mechanism including a guide wheel arranged to follow a furrow, of a furrow forming attachment comprising an arm projecting laterally from said rig, capable of vertical movements and provided at its outer end with a furrow forming disk and with a supporting gage wheel, the latter serving to support the outer end of said arm and limiting the depth of the furrow formed by said disk, the furrow thus formed by said disk on one trip adapted to be followed by said guide wheel on a subsequent trip.

In testimony whereof I affix my signature in presence of two witnesses.

CHARLES S. WHITWORTH.

Witnesses:
ARTHUR EDWARDS,
H. B. BOIES.